United States Patent [19]
Gonia et al.

[11] Patent Number: 5,727,665
[45] Date of Patent: Mar. 17, 1998

[54] CLUTCH HAVING FRICTION ELEMENTS MADE FROM A SINTERED METAL MATERIAL

[75] Inventors: Detlef Gonia, Remscheid; Valentin Manolache, Radevormwald; Norbert Schulz, Marienheide, all of Germany

[73] Assignees: Sinter-Metallwerk Krebsöge GmbH, Radevormwald; Raybestos Industrie-Produkte GmbH, Morbach, both of Germany

[21] Appl. No.: 556,935

[22] PCT Filed: Mar. 31, 1995

[86] PCT No.: PCT/EP95/01198

§ 371 Date: Mar. 21, 1996

§ 102(e) Date: Mar. 21, 1996

[87] PCT Pub. No.: WO95/27153

PCT Pub. Date: Oct. 12, 1995

[30] Foreign Application Priority Data

Apr. 2, 1994 [DE] Germany ............ 44 11 641.1

[51] Int. Cl.$^6$ ............ F16D 13/64; F16D 69/02
[52] U.S. Cl. ............ 192/70.14; 192/52.3; 192/107 M
[58] Field of Search ............ 192/70.14, 107 M, 192/52.3

[56] References Cited

U.S. PATENT DOCUMENTS

| | | | |
|---|---|---|---|
| 2,902,130 | 9/1959 | Halberg et al. | 192/70.14 X |
| 3,191,734 | 6/1965 | Batchelor et al. | 192/70.14 |
| 3,948,364 | 4/1976 | Lowey | 192/107 M X |
| 5,154,683 | 10/1992 | Phelps | 192/70.14 |

Primary Examiner—Richard M. Lorence
Attorney, Agent, or Firm—Spencer & Frank

[57] ABSTRACT

An engaging and disengaging clutch includes a clutch disk having friction linings on each of two sides thereof, the friction linings being made from an organically bound friction material; a counterrotating member and a pressure plate both disposed adjacent the clutch disk; and a friction element disposed on at least one of the counterrotating member and the pressure plate and defining a friction surface being made from a sintered metal material. The sintered metal material contains therein any heavy components adapted for use in the friction linings of the clutch disk and in the friction element for achieving an optimum friction pairing therebetween, the organically bound friction material thereby being free of the heavy components.

21 Claims, 4 Drawing Sheets

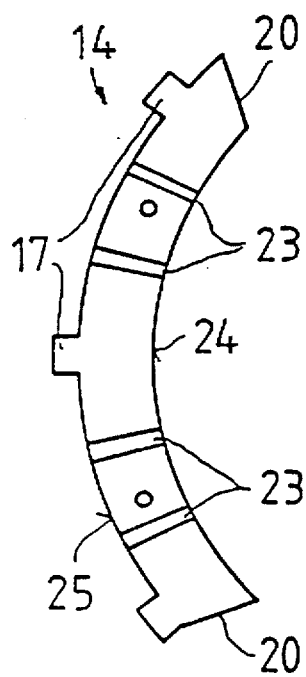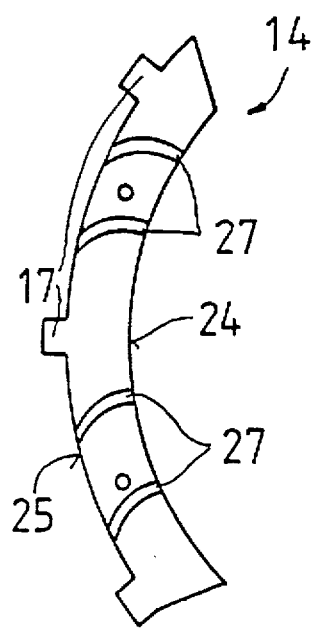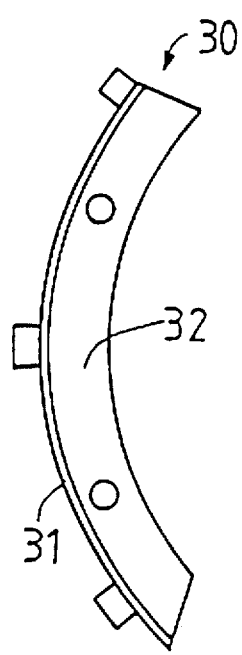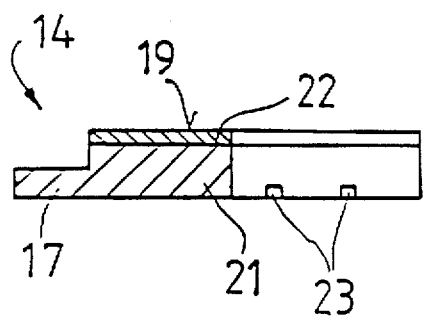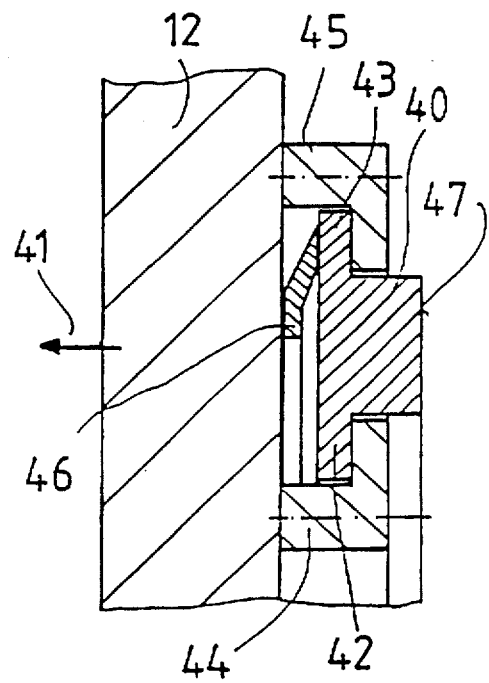

CLUTCH HAVING FRICTION ELEMENTS MADE FROM A SINTERED METAL MATERIAL

FIELD OF THE INVENTION

The invention relates to an engaging and disengaging clutch, particularly for motor vehicles, having at least one clutch disk and at least one counterrotating member, each of which are provided with at least one friction surface.

BACKGROUND OF INVENTION

Clutches such as the one described above are frequently embodied as so-called dry single-disk clutches, wherein the clutch disk, which is arranged on the output shaft in a manner fixed against relative rotation, is pushed against the counterrotating member via spring elements by means of a pressure plate. In such a clutch, the frictionally locked power transmission takes place between, on the one hand, the friction surface of the usually organic friction lining of the clutch disk and the friction surface of the counterrotating member and, on the other hand, between the friction surface of the friction lining disposed on the other side of the clutch disk and the friction surface of the pressure plate. The following text no longer differentiates between the friction surface of the counterrotating member and the friction surface of the pressure plate and predominantly discusses only the friction surface of the counterrotating member, which is not intended to imply that the friction surface of the counterrotating member and the friction surface of the pressure plate are embodied so as to be identical.

As a rule, the friction linings of the clutch disk are comprised of an organic material which is reinforced by means of fibers, textile materials, synthetic resin or the like and which may, depending on the requirements, also comprise, for example, metal particles or ceramic components. Particularly in dry single-disk clutches, the friction surface of the counterrotating member is comprised of the same material of which the counterrotating member and the pressure plate are made. Generally, the counterrotating member is simultaneously configured as flywheel of the drive engine and it is generally comprised of grey cast iron and, less frequently, of steel.

In general, the friction pairing of the clutch for the frictionally locked power transmission has been adjusted to the requirements that have to be met only by a corresponding selection of the friction linings on the clutch disk. But it turned out that the thus resulting friction pairings did not always meet the desired demands. In particular, for example, due to metallic components in the friction lining, the clutch disk is provided with a moment of inertia which is too high and which has a negative impact on the clutch engagement process.

SUMMARY OF THE INVENTION

It is an object of the invention to create a clutch in which it is easily possible to adjust the friction pairing to the demands that have to be met.

This object is accomplished according to the invention in that the friction material for at least one friction surface is comprised of a sintered metal material. The invention relates particularly to the embodiment of the friction surfaces of the counterrotating member and of the pressure plate from a sintered metal material. The following will mainly address the friction surface of the counterrotating member made of sintered metal material, but this is not intended to include a limitation.

The use of a sintered metal material as a friction material for the friction surface has the advantage that, on the one hand, by way of powder-metallurgical processes a material can be made available which can be optimized in a simple manner with respect to its frictional behavior, thermal conductivity and mechanical strength. On the other hand, materials can be created by means of powder metallurgy which cannot be obtained or which can only be obtained with great difficulty through casting. In an embodiment of the invention it is provided that the friction material comprises 10 to 15% weight percent copper (Cu). A special advantage of using a friction material made of a sintered metal material is that, because of its method of manufacture, the sintered metal material has a certain porosity which has a favorable impact on the frictional behavior of the clutch. It is therefore no longer required that the friction lining of the clutch disk be porous. Over time, a porosity of the organic friction lining is reduced anyway because of the nature of the material and is clogged due to abrasion, particularly of the binding agent that is generally present. It turned out that a porosity which is present on the metallic friction surface does not clog as easily.

A further advantage in the use of a friction material made from a sintered metal material is that, for optimizing the friction pairing, heavy components (that is, components which substantially add to the weight of the friction material in which they are used, such as, for example, metal particles) can be integrated purposefully into the counterrotating member instead of into the clutch disk. Thus, here, the organic friction lining may essentially be free from metal particles, for example, which can reduce its weight and thus the moment of inertia of the clutch disk.

Depending on the size of the clutch and the demands which must be met by the clutch, it may be advisable for the counterrotating member and/or the pressure plate to be manufactured in one piece from the sintered metal material which also serves as friction material. But in embodying the invention it may be advisable, particularly depending on the size, if the friction surface made of the sintered metal material is arranged on at least one friction element which is connected to the counterrotating member. Here, it may be advisable for the friction element to be connected to the counterrotating member so as to be detachable. This embodiment has the advantage that the counterrotating member or the pressure plate must only possess the required mechanical strength, while the friction element can be adjusted to the friction lining in an optimum manner by a corresponding selection of the sintered metal material. Furthermore, by using friction elements which can be connected to the counterrotating member at a later time and, if required, in a manner so as to be detachable, the powder metallurgical production process can be simplified because only small-sized components have to be made.

The connection of the friction element to the counterrotating member or to the pressure plate, which connection is fixed against relative rotation, can take place, for example, by means of screws, rivets or by a correspondingly configured press fit or shrinkage fit. Because of the high torques that have to be transmitted, it may be advisable in embodying the invention for the friction element to be form-fittingly connected to the counterrotating member. For this purpose it may be provided, for example, that the friction element has at least one projection and/or one recess which cooperates with a corresponding recess or a corresponding projection of the counterrotating member. Here, the projection or the recess may extend in the axial and/or the radial direction.

As a function of the required thickness of the friction element and of the selection of the friction material, it may be advisable for the friction element to be made in one piece from the sintered metal material which serves as friction material. In another embodiment of the invention it may be provided that the friction element has a multilayered design in the axial direction and that at least the friction lining layer is made from the sintered metal material. This may be advisable particularly if the friction material does not have the required mechanical strength. In this case, the friction element may be, for example, of a two-layered construction, with the supporting layer allocated to the counterrotating member being made of a material with great mechanical strength. Here, the supporting layer and the friction lining layer may both be manufactured by way of powder-metallurgical processes in the composite process. It is also possible, of course, to apply the friction lining layer made of the sintered metal material on a supporting element which is comprised, for example, of steel in order to obtain the desired friction element.

In a further embodiment of the invention it is provided that, at least in one edge region facing the friction surface, the friction element is provided with a material which is different from that of the remainder of the friction surface. This has the advantage that the edge regions of the friction surface, which are subject to a special wear, can be made of a material having greater wear resistance. This is readily possible in the production of a friction element by means of powder metallurgical composite processes.

In general, it will suffice if the friction element is made of one piece in an annular shape. Particularly as a function of the size of the diameter of the friction surface, it may be advisable in embodying the invention to use a plurality of friction elements so that the friction surface in the rotating direction is arranged at least on two friction elements. This has the advantage that the individual friction elements may be configured to be smaller, thus further simplifying the powder metallurgical manufacturing method.

In a further-developed embodiment of the invention, it is provided that the friction surface is arranged in the radial direction on at least two friction elements. In this configuration, for example, two annular friction elements can be provided extending substantially concentrically with respect to one another. The outer friction element, for example, may comprise a friction material having a greater wear resistance because, in the regions of the friction surfaces with a greater diameter, higher friction speeds occur and thus greater wear. Furthermore, it may be advisable for friction elements embodied in this manner to not extend exactly concentrically with respect to one another to prevent the formation of a shoulder in the oppositely disposed friction lining.

If a plurality of friction elements are arranged in the circumferential direction, it is advisable according to a further embodiment in accordance with the invention that the limiting edges of the friction elements arranged next to one another in the circumferential direction extend at least partially in a direction that deviates from the radial direction. In this manner, rough transitions from the one friction element to the other can be prevented reliably. Additionally, it may be suitable if a gap is present between the friction elements. This has the advantage that the friction surface is cooled better and that an air cushion which might form between the friction surfaces can be carried off better.

To improve the cooling, another embodiment of the invention may include a friction element which is provided, at least at its side facing away from the friction surface, with at least one groove extending from the inner to the outer circumference. Here, it may be advisable if the groove extends radially from the inner to the outer circumference or follows, for example, a spiral and/or arc shape. In the mounted position, the grooves are thus located between counterrotating member and friction element so that cooling air is allowed to circulate, whereby the dissipation of heat is favored. In principle it is also possible, of course, to provide bores within the friction element extending from the inner to the outer circumference, but it is considerably easier to manufacture grooves that are arranged on the bottom side, particularly in friction elements that are made from a sintered metal material. It may also be advisable to arrange such grooves on the friction surface.

In order to improve the starting comfort, it is generally customary in a clutch that the friction lining is arranged on the clutch disk in the axial direction so as to be yielding to a small degree. In a further-developed embodiment of the invention it may be provided that the friction element is yieldingly connected in the axial direction to the counterrotating member. This has the advantage that the friction lining on the clutch disk no longer has to be connected to the clutch disk by means of yielding elements so that the weight and, in particular, the moment of inertia of the clutch disk can be reduced.

Furthermore, it may be advisable if, in case of a division of the friction surface in the radial direction among at least two friction elements, the friction elements allocated to respectively different diameters are connected to the counterrotating member so as to have a different yieldingness. This has the advantage that the yieldingness may be better adjusted to the demands, thus improving comfort, particularly during the engagement of the clutch. It may be provided, for example, that the yieldingness of the friction element allocated to the inner radius is smaller than that of the friction element allocated to the outer diameter so that the regions having a smaller circumferential speed are the ones to first effect a power transmission.

If the friction elements are arranged on the counterrotating member so as to be yielding, it may be further provided that the friction surface which is formed by the friction elements extends on an incline relative to the other friction surface. It may be provided, for example, that the distance between the outer region of the friction surface and the oppositely disposed other friction surface is smaller than the distance between the inner region of the friction surface and the oppositely disposed other friction surface. This has the advantage that signs of wear can be compensated for, which signs show up especially in the outer region of the friction surface due to the greater friction speeds.

Apart from the possibility of optimizing the friction pairing, the use of separate friction elements has the advantage that only the friction elements must be replaced in case of wear. In this manner, the repair costs of a worn-out clutch can be kept low and, in addition, less waste which would have to be disposed of is created.

In another embodiment of the invention it is provided that the counterrotating member of the clutch is embodied as a dual-mass flywheel and the primary mass having the friction surface is made of sintered metal material. The primary mass of a dual-mass flywheel usually is substantially smaller than the secondary mass so that it is advisable to embody the flywheel forming the primary mass entirely of sintered metal material. Here, this flywheel may be provided, for example, with a multilayered construction and the layer forming the friction surface may be adjusted to the friction conditions.

In another embodiment of the invention it is provided that the friction material is sintered onto the counterrotating member. It is possible, in particular, to apply the friction material to already existing counterrotating members, e.g., in the event of a repair. In case of wear, it may also be provided to only replace the friction material layer. In this manner, the repair costs may also be kept low and almost no waste which would have to be disposed of is created.

In a multi-disk clutch or multi-plate clutch, it may be advisable for the output plates or the driving plates to be composed of sintered metal material. Here, it is also possible, of course, that the plates have a multilayer configuration.

In another embodiment of the invention it is provided that the clutch has a one-piece disk as a clutch disk which is composed of sintered metal material at least in the region of the friction surface. In this case, the friction lining is arranged on the counterrotating member. Here, it is possible, in principle, that the friction lining is also arranged on friction elements of the type described at the outset. Because of the small mechanical strength of such organic friction linings, it may be advisable here to embody the friction elements with multiple layers, with it being possible that the friction lining layer is comprised of a glued-on friction lining and the supporting layer, for example, of steel. Particularly in this embodiment, the mass of the clutch disk and thus the moment of inertia can be reduced further. In such a configuration, the torsion bar spring system is advisably incorporated into the counterrotating member.

BRIEF DESCRIPTION OF THE INVENTION

The invention is described in greater detail below by way of the drawing, in which:

FIG. 3 is a bottom plan view of a first embodiment of a friction element,

FIG. 4 is a bottom plan view of a second embodiment of a friction element,

FIG. 5 is a sectional view of a friction element,

FIG. 6 is a top plan view of a friction element,

Figure 8:
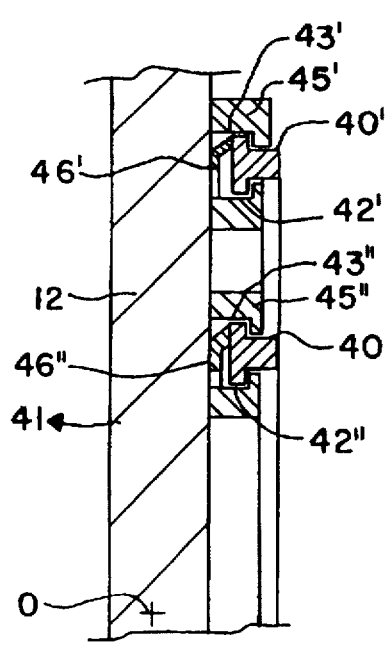
Figure 9:
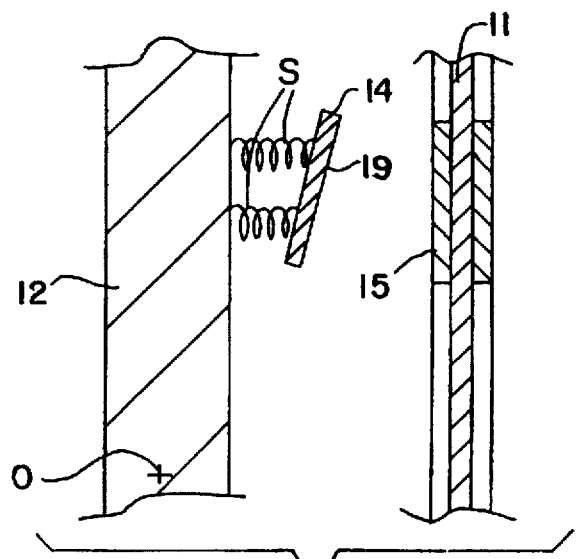
Figure 10:
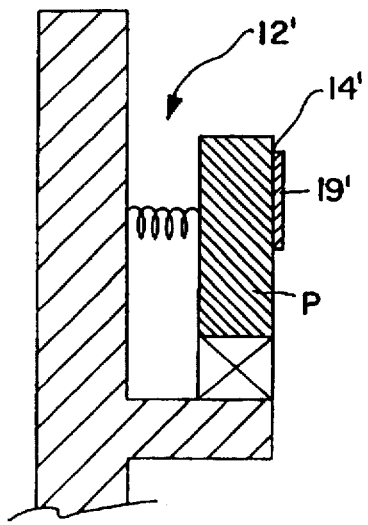
Figure 11:
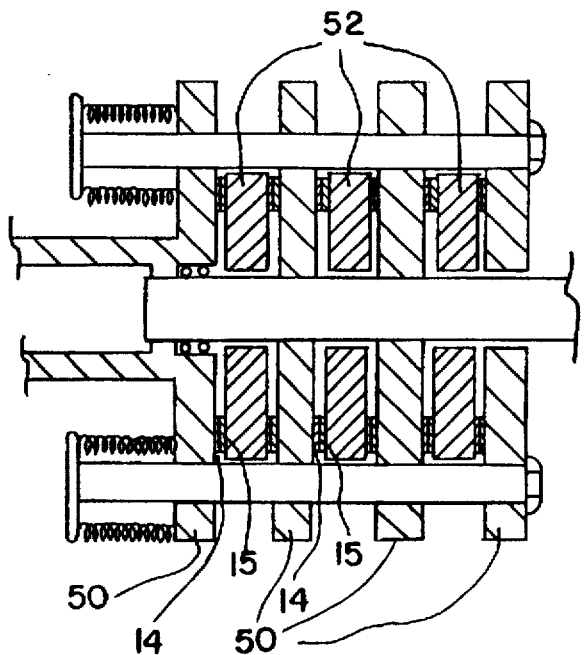

FIG. 7 is a sectional view of the mounting of a friction element with the counterrotating member, FIG. 8 is a sectional view of a mounting of a plurality of friction elements in the radial direction, FIG. 9 is a schematic, sectional view of a mounting of a friction element having yieldingness and being inclined, FIG. 10 is a schematic, sectional view of a dual-mass flywheel having a friction element thereon, and FIG. 11 is a schematic, sectional view of a multiple-plate clutch including friction elements thereon.

DETAILED DESCRIPTION OF THE INVENTION

The clutch 10 shown in the drawing is provided with a clutch disk 11, a counterrotating member 12 and a pressure plate 13. The design and the arrangement of the individual construction elements of the clutch 10 essentially correspond to the configuration of a conventional dry single-disk clutch and are therefore not explained in greater detail in the following. In particular, the drawing does not show details of the actuating means for the pressure plate 13.

Figure 1:
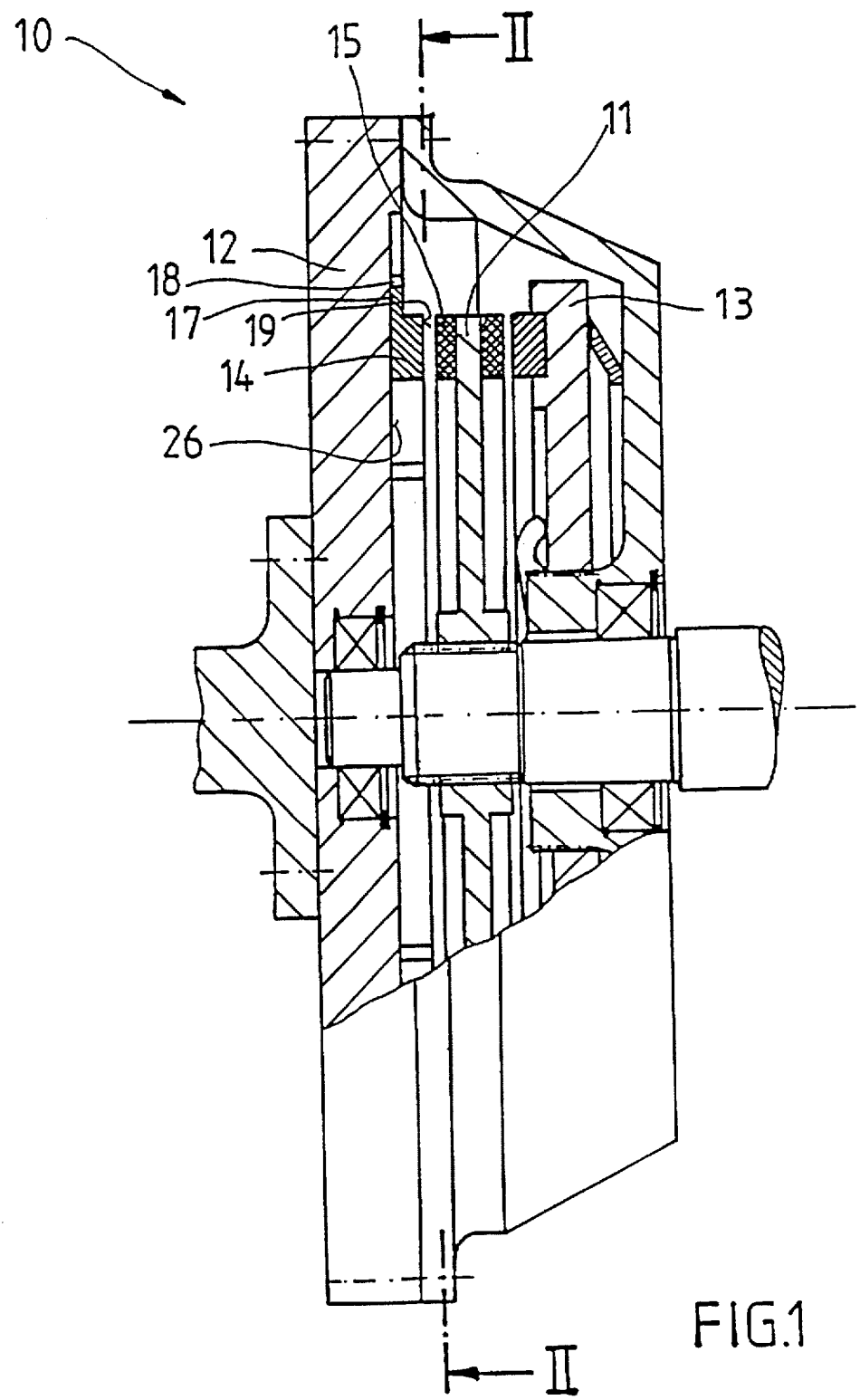
FIG. 1 is a sectional view of a clutch according to the invention.
Figure 2:
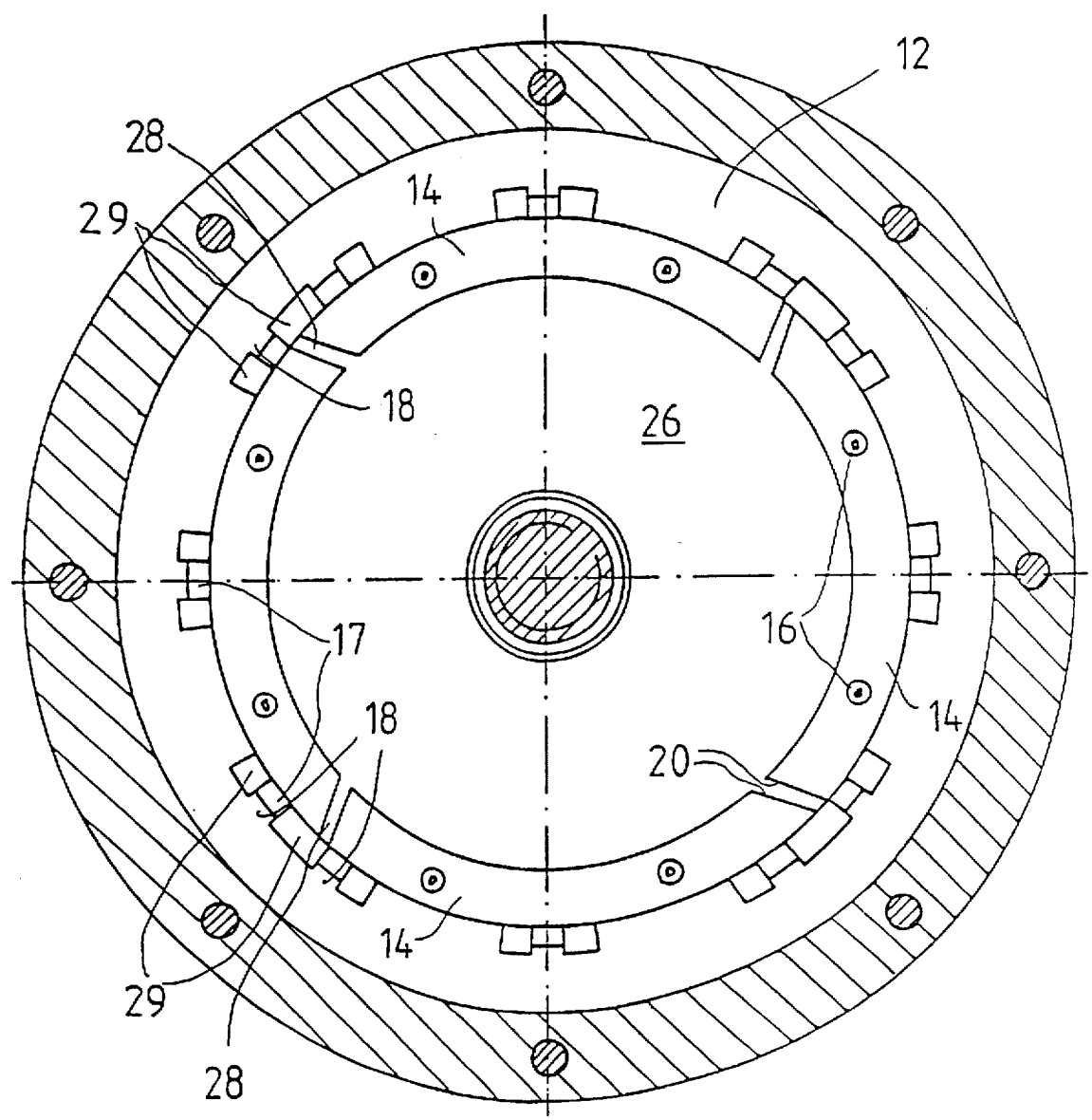
FIG. 2 is a view of a section along line II—II in FIG. 1.

Friction elements 14 are arranged on the counterrotating member 12, which cooperate with the friction lining 15 that is arranged on the one side of the clutch disk 11. In the embodiment shown in FIG. 2, the counterrotating member 12 is provided with four friction elements 14 in the circumferential direction, with each friction element extending approximately over a quarter circle. Of course, it is also possible to use only a single annular friction element or to use a different number of friction elements. In order to prevent hard transitions between two adjacent friction elements, the limiting edges 20 do not extend in the radial direction. In this manner, a smooth transition from the one friction element to the other becomes possible. As can be seen from FIG. 2, there is a gap 28 respectively between the friction elements 14 in the mounted position. In this manner, the cooling of the friction surface and of the friction elements can be improved.

On their outer circumference, the friction elements 14 have projections 17 which are oriented outwardly in the radial direction and which engage the corresponding recesses 18 of the counterrotating member 12 so as to produce a form-fitting connection for the transmission of the torque. In the shown embodiment, each recess 18 is formed by two axial projections 29 of the counterrotating member 12. Of course, it is also possible for such projections and recesses to be arranged on the inner side of the friction elements. In the embodiment shown in FIG. 2, the friction elements 14 are secured to the counterrotating member 12 by means of fastening screws 16 which are arranged on the friction surface 19. It is also possible, of course, for the fastening screws to be arranged outside of the friction surface 19, for example, on a circumferential projection or at least on one of the projections 17. Such an arrangement has the advantage that air cushions are prevented from building up between the cooperating friction surfaces. Furthermore, it may be provided that, from the side facing away from the friction surface 19, the friction elements 14 are connected to the counterrotating member 12 by means of screws that are guided through corresponding through-bores in the counterrotating member 12.

The friction elements 14 may be produced from a sintered metal material in a single layer. This sintered metal material may comprise, for example, 10 to 15 weight percent copper, which material has better frictional properties with the friction lining 15 being comprised, for example, of organic material. Of course, a multilayered configuration of the friction element 14 is also possible. As can be seen particularly in FIG. 5, such a friction element 14 has a supporting layer 21 which is provided with a friction lining layer made of the desired friction material 22.

On its bottom side, the friction element 14 is provided with radially extending grooves 23, as can be seen particularly from FIG. 3, which grooves extend from the inner circumference 24 to the outer circumference 25 of the friction element 14. In the embodiment according to FIG. 4, the grooves 27 corresponding to grooves 23 as previously described, are configured so as to be approximately arc-shaped. In the mounted position, these grooves 23 form channels with the corresponding surface 26 of the counterrotating member 12, through which channels the air can flow to cool the friction elements and the friction surface.

FIG. 6 shows a different embodiment of a friction element 30. In its edge regions 31, the friction element 30 is made of a different material than in the region of the remaining friction surface 32. By means of powder metallurgical processes it is easily possible to produce a friction element 30 which is configured of multiple layers in this manner. The edge regions 31 may, for example, be comprised of a material having a greater wear resistance to counteract the increased wear which normally occurs in this region.

FIG. 7 shows a fastening option for a friction element 40 on the counterrotating member 12, wherein the friction element 40 is seated so as to be yielding in the axial direction 41. For this purpose, the friction element 40 is provided on its inner and outer circumference with at least partially circumferential projections 42 and 43 which cooperate by means of corresponding retaining elements 44 or 45 which can be connected to the counterrotating member 12, for example, by way of screws. Here, the projections 42 or 43 may be provided with recesses, which are engaged by corresponding projections of the retaining elements 44 or 45 or by projections that are arranged directly on the counterrotating member 12, to allow a form-fitting transmission of the torque. In their cross section, the retaining elements 44, 45 are essentially L-shaped, with the one leg forming an axial stop for the friction element 40. The friction element 40 is pushed against this axial stop by a spring element 46 which, for example, is configured as a diaphragm spring. This arrangement ensures that, in the axial direction, the friction surface 47 in the disengaged position is always disposed at a defined distance from the friction lining of the clutch disk. In the engaged state, the friction element 40 is pushed up to the stop against the spring force of the diaphragm spring 46. Usually, this path amounts to only a few millimeters or to only fractions of a millimeter.

As seen in FIG. 8, the counterrotating element 12 may be provided with a plurality of friction elements 40' and 40" arranged in a radial direction with respect to rotational center 0 of element 12. Friction elements 40' and 40" are seated so as to be yielding in the axial direction 41. The structure of the mounting for the friction elements is similar to that shown in FIG. 7, with partially circumferential projections 42', 42", 43' and 43" operating by means of retaining elements 44', 44" or 45', 45". Friction elements 40' and 40" are pushed against their respective axial stops by spring elements 46' and 46", respectively, configured, for example, as diaphragm springs. As shown in FIG. 8, spring 46' is thinner and therefore more resilient than spring element 46", such that the friction elements have respective levels of yieldingness as a function of their respective radial locations with respect to center 0.

As shown schematically in FIG. 9, the friction surface 19 of the friction element 14 may be inclined relative to a surface of a corresponding one of the friction linings 15 of the clutch disk 11. The yieldingness of friction element 14 is indicated in FIG. 9 only schematically by way of springs S, which may be configured, for example, similarly to spring elements 46, 46' and 46" described above. The friction element in FIG. 9 may further be disposed in an appropriate housing defined by, for example, circumferential projections such as projections 42, 43, 42', 43', 42" and 43" as described above.

As seen in FIG. 10, the counterrotating member may be a typical dual mass flywheel 12' shown schematically and comprising a flywheel component P forming a primary mass thereof and being made from the sintered metal material at least at a surface thereof, such as at the friction element 14' shown thereon, for forming the friction surface 19'.

FIG. 11 shows a typical multiple-plate clutch having driving plates 50 and output plates 52, the output plates being provided with a friction linings 15 thereon. According to the invention, only friction elements 14 of the driving plates have friction surfaces made of a sintered material.

The above explanations only relate to the arrangement of friction elements 14 on a counterrotating member 12. Of course, it is possible and also advisable to provide such friction elements on the pressure plate 13 of the clutch 10. The fastening and the arrangement of the friction elements in detail correspond to the fastening and arrangement of the friction elements on the counterrotating member.

We claim:

1. An engaging and disengaging clutch comprising:
    a clutch disk including friction linings on each of two sides thereof, the friction linings being made from an organically bound friction material;
    a counterrotating member and a pressure plate both disposed adjacent the clutch disk; and
    at least one friction element disposed on at least one of the counterrotating member and the pressure plate and defining a friction surface being made from a sintered metal material, the sintered metal material further containing therein any heavy components adapted for use in the friction linings of the clutch disk and in the friction element for achieving an optimum friction pairing therebetween, the organically bound friction material thereby being free of the heavy components.

2. The clutch according to claim 1, wherein the friction material comprises 10 to 15 weight percent copper (Cu).

3. The clutch according to claim 1, wherein the friction element is connected to one of the counterrotating member and the pressure plate.

4. The clutch according to claim 3, wherein the friction element is detachably connected to one of the counterrotating member and the pressure plate.

5. The clutch according to claim 3, wherein each of the friction element and one of the counterrotating member and the pressure plate have one of a projection and a recess such that one of the projection and the recess of the friction element form fittingly mates with a corresponding one of the recess and the projection of one of the counterrotating member and the pressure plate for connecting the friction element to one of the counterrotating member and the pressure plate.

6. The clutch according to claim 1, wherein the friction element is a one-piece component made of the sintered metal material.

7. The clutch according to claim 1, wherein the friction element is a multi-layered component including a plurality of layers in a direction of a longitudinal axis of the clutch, the layers comprising a friction lining layer made from the sintered metal material and defining the friction surface.

8. The clutch according to claim 1, wherein the friction surface, at at least one edge region thereof facing the friction linings, is made of a different sintered metal material than a remainder of the friction surface.

9. The clutch according to claim 1, wherein the at least one friction element comprises a plurality of friction elements arranged about a circumference of at least one of the counterrotating member and the pressure plate.

10. The clutch according to claim 1, wherein the at least one friction element comprises a plurality of friction elements arranged in a radial direction on at least one of the counterrotating member and the pressure plate.

11. The clutch according to claim 9, wherein each of the friction elements defines limiting edges spaced with respect to one another in a circumferential direction of the clutch and extending in a direction having a component perpendicular to a radial direction of the clutch.

12. The clutch according to claim 9, wherein adjacent ones of the friction elements define gaps between one another.

13. The clutch according to claim 1, wherein the friction element, at its side facing away from the friction linings, defines a groove extending from an inner circumference to an outer circumference of the friction element.

14. The clutch according to claim 13, wherein the groove is arcuate.

15. The clutch according to claim 3, wherein the friction element is connected to at least one of the counterrotating member and the pressure plate so as to be yielding in a direction of a longitudinal axis of the clutch.

16. The clutch according to claim 15, wherein:
the at least one friction element comprises a plurality of friction elements arranged in a radial direction on at least one of the counterrotating member and the pressure plate; and
the friction elements are connected to one of the counterrotating member and the pressure plate so as to have respective levels of yieldingness as a function of their respective radial locations.

17. The clutch according to claim 15, wherein the friction surface of the friction element is inclined relative to a surface of a corresponding one of the friction linings.

18. The clutch according to claim 1, wherein the counterrotating member is a dual mass flywheel comprising a flywheel component forming a primary mass thereof and being made from the sintered metal material at least at a surface thereof for forming the friction surface.

19. The clutch according to claim 3, wherein the friction element is sintered onto at least one of the counterrotating member and the pressure plate.

20. The clutch according to claim 1, wherein the clutch is a dry single-disk clutch.

21. The clutch according to claim 1, wherein the clutch is a multi-plate clutch having an output plate and driving plates, only the driving plates defining respective friction surfaces made of a sintered metal material.

* * * * *